(12) United States Patent
Lefave (10) Patent No.: US 6,704,012 B1
(45) Date of Patent: Mar. 9, 2004

(54) MULTI-VARIABLE GRAPHICAL INTERFACE AND METHOD

(75) Inventor: Karen Ann Lefave, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,822

(22) Filed: Apr. 27, 1999

(30) Foreign Application Priority Data

Apr. 28, 1998 (CA) .............................................. 2236063

(51) Int. Cl.[7] ................................................. G09G 5/00
(52) U.S. Cl. .................. 345/440; 345/440.1; 345/440.2; 345/140; 345/155
(58) Field of Search ................................. 345/440, 740, 345/755; 364/188, 146, 181; 395/740, 755

(56) References Cited

U.S. PATENT DOCUMENTS

| | | | |
|---|---|---|---|
| 4,745,543 A | * 5/1988 | Michener et al. | ........... 364/188 |
| 5,404,430 A | * 4/1995 | Tashiro et al. | .............. 395/140 |
| 5,999,193 A | * 12/1999 | Conley, Jr. et al. | ......... 345/440 |

* cited by examiner

*Primary Examiner*—Kristine Kincaid
*Assistant Examiner*—Mylinh T Tran
(74) *Attorney, Agent, or Firm*—Douglas W. Cameron; Anne Vachan Dougherty (57) ABSTRACT

Present computer software tools for monitoring system performance variables particularly for online activity, are not convenient to use and are not overly effective in their use for identifying critical situations. There is a need for users to be able to readily deduce the accumulated effect of a number of variables on the functioning of a computer system. This is often made more difficult when scales of absolute values of the variables involved are significantly different. The multi-variable graphical interface and method of the present invention addresses many of these concerns. A graphical user interface and method is described wherein at least one zone appears on the display representing threshold values for the variables and overlying the zones, representations or line graphs of one or more of the variables is provided. Thus, their results and accumulated indications as to the functioning of the computer system based on the plurality of performance variables selected is provided in a visual manner.

49 Claims, 3 Drawing Sheets

MULTI-VARIABLE GRAPHICAL INTERFACE AND METHOD

FIELD OF THE INVENTION

The subject invention broadly relates to information handling systems and methods related thereto. The invention more particularly relates to the field of performance tools used to display and analyze system performance variables during the operation of information handling systems and computing systems.

BACKGROUND OF THE INVENTION

Various methods and uses of performance tools for collecting and assessing data and methods of displaying collected data of dependent variables are known for a variety of situations and applications. Examples of such systems and methods will now be presented.

A. J. Blasciak in U.S. Pat. No. 5,103,394 describes a software performance analyzer. This patent issued on Apr. 7, 1992 and is assigned to Hewlett-Packard Company. The disclosed subject matter describes a measurement tool that assists software designers in software development cycles in the testing, debugging and optimization of the program under development. The software performance analyzer performs six separate non-intrusive measurements relating to the program consisting of program activity, memory activity, module duration, module usage, inter-module duration and inter-module linkage. The relevant data pertaining to each of these measurements is collected, analyzed and displayed in either a histogram or tabular format.

U.S. Pat. No. 5,307,455, entitled "Display of Multiple Variable Relationships", issued to Higgins et al on Apr. 26, 1994 and is assigned to Hewlett-Packard Company. This patent describes methods for graphical and numerical displaying of the joint variation of two or more variables with the variation of a third independent variable. The dependent variables could be chemical concentrations of a given substance. The method pertains to presenting the relationships of two or more related dependent variables in a single graphical format in which the independent variable is allowed to vary continuously over its permitted range. The method permits a continuous display of the changes in an independent variable and the effect on the resulting values of two or more variables that depend on the independent variable. A collection is provided of Cartesian coordinate pairs for each of a sequence of increasing values of the third variable. These coordinate pairs are displayed on a two-dimensional graph on a computer monitor or similar screen with an identification label which indicates the value of the independent variable for each coordinate pair provided on the graph. The data may also be provided in a numerical table. An additional, movable indicator is provided that indicates the-coordinate pair of the dependent variables for the current choice of the independent variable.

U.S. Pat. No. 5,432,932 entitled "System and Method for Dynamically Controlling Remote Processes from a Performance Monitor", issued to Chen et al on Jul. 11, 1995, and is assigned to International Business Machines Corporation. This patent discloses graphical user interface subsystems and graph to monitor multiple data values supplied by a data value receiver subsystem. The patent describes and refers to software tools for providing a graphical interface to visually depict various aspects of the data processing system, thereby reducing the amount of time required to analyze the operation of a data processing system.

The description provides for the collection of performance data and the computation of performance statistics. The data is displayed on vertical scales to plot absolute values of the variable data against time on the same Y axis of the graph. Processes of the data processing system to be controlled can be ranked when graphically presented to a user to assist in determining problematic processes that need attention. By means of the graphical user interface, a user can sort and refresh snapshots of the data to facilitate the selection of appropriate process control measures of the data processing system.

The data base technology products for the client/server environment available from IBM, namely DB2® UDB, Version 5, includes a DB2 performance monitor feature. This feature provides a workstation-based online monitor of variables which simplifies online monitoring and problem analysis of variables of the product of which it is a component. It enables the user to monitor, analyze and optimize the performance of the product and its subsystems. The performance monitor feature includes a graphical user interface for selecting one or more variables from a variety of performance variables and displaying the resultant data on a graph on the display screen. The variables are visually displayed on a graph consisting of an extendable X-axis of time and a variable Y-axis which is based on a percentage of the particular scale value for that variable. In order for a system administrator to obtain a sense of the sensitivity or criticality of the value of the plotted variable it is necessary to obtain an indication of the absolute value of the variable. This can be somewhat cumbersome and inconvenient. First the administrator must determine what percentage of the Y-axis (0 to 100) is the value of the plotted variable at a particular point in time (eg. 53); then a cascading menu is pulled down to reveal a dialog which indicates to the user the scale that the variable is plotted against in the graph (eg. 1052); then the administrator, in this example, must multiply 53×1052= 55756; then a further cascading menu is pulled down to obtain a current threshold value set for that particular variable. The above calculated value (example 55756) is compared to the threshold value to obtain a sense of how critical or sensitive is the value of the particular variable. These steps must be repeated for each of the variables depicted on the graph.

A performance monitor is provided in the Windows NT® product. A typical Windows® screen is available for displaying the results of the monitoring of one or more variables pertaining to the computer system on which the product is installed. This is a graphical tool for viewing and dynamically changing charts reflecting variables and the current activity of the computer system. The value of a selected variable is displayed on a line graph in which the X-axis is time dependent and the Y-axis is a percentage value of each variable. In order to determine the absolute value of a variable, the number displayed must still be multiplied by a scale factor and compared with a threshold value for each variable on the graph. The Windows NT performance monitor can plot multiple variables on a single graph however a scale factor multiplication is needed for each variable similar to what has been previously described. The operator can only view a trend in the value of the variable but has no clue as to the severity of the situations without picking a value of a variable, multiplying it by a scale factor, and comparing it to a threshold value known to the user through acquired experience.

Although the above systems and methods referred to, which are considered to be examples of those presently known and available, provide improvements over previous methods for monitoring, analyzing and displaying data relating to performance variables of data processing systems, there are still significant deficiencies in the flexibility of these systems for use by a user at an online workstation. Typically the data of the value of the variables is merely displayed to the user with little or no quantitative sense apparent as to the meaning or effect of the variable on the functioning of the system performance. It is difficult and in many instances, meaningless, to look at a graph, whether a graph is in the form of line graph, an area graph or a bar graph, to readily deduce the effective significance of the displayed data.

Monitoring multiple-variable systems is a complex task which is also often time critical. It must be made relatively easy for a user or operator of the system to determine quickly when the system is in a critical state. A quick glance at a computer screen which allows the operator to see key activity variables of the system and determine whether they have reached a certain threshold, is significant. It is also important for the user to be able to readily deduce how far into the danger zone the variables are and the accumulated effect and trends of the variables over a period of time, as to whether the variables stay in the danger zone or gradually build up or dip in and out of the danger zone. Awareness by the user as to the relative severity of the values of the variables can be crucial to the effective functioning of the system.

The above problems are compounded in information handling systems by the fact that the variables do not lie on the same scale. It is therefore difficult to plot these variables against each other and to assess their combined result on the operation of the system without requiring the operator to do some calculations to determine the absolute values and compare these against known threshold values for the variables. For example, percentage of central processing usage could be measured on a scale of 0 to 100, whereas the number of input/output reads could be measured from zero to thousands, and an indication of response time would be measured from 0 to 20 seconds, all on very different scales. It is difficult to represent these variables to an operator in one quick view that will give the user the necessary information in one glance as to the presence of a critical situation. Typically, operators and users of systems do not want to deal with absolute values since they are only meaningful in relation to a threshold value or a particular trend for that variable.

SUMMARY OF THE INVENTION

It is therefore an object of the present invention to provide a new and more useful multi-variable graphical interface and method for collecting and displaying data of variables on a computer screen.

It is a further object of the present invention to provide for a multi-variable graphical interface which overcomes many of the known problems of existing interfaces for displaying variable data.

It is a further object of the present invention to provide a method and system for displaying variable data of activities obtained from a variety of information handling systems for industries needing to do monitoring of multi-variable systems and display the results on a computer screen.

It is a further object of the present invention to provide a graphical user interface for displaying multi-variable data of activities which is user friendly and readily provides more significant indications to the user as to the criticality of the values of the variables than presently available systems.

It is yet a further object of the present invention to provide a program storage device and a computer-readable memory element containing instructions executable by a computer to implement a new and more useful multi-variable graphical user interface and method for collecting and displaying data of variables on a computer screen.

According to one aspect of the invention, there is provided a graphical user interface displaying representations of the values of at least one variable on a display of a computing system to provide indications as to how the variables relate to pre-determined threshold values of the variables over time and where the variables relate to an operation of an information handling system. The graphical user interface includes at least one zone in a screen on the display of the computing system such that the zones represent threshold values for each of the variables. The interface further includes representations of the values of said variables over time overlying the zones in accordance with the threshold value of the zones so as to provide a visual indication of the functioning of the information handling system.

A further aspect of the invention is directed to a method of displaying representations of at least one performance variable of an information handling system on a display of a computing system where the method is performed by a programmed computer system. The method includes the steps of providing at least one zone in a screen on the display of the computing system such that the zones represent threshold values of the variables and providing representations of the values of the variables on the screen within said zones such that over time, a visual impression is provided by said representations as to the performance of the information handling system.

According to a further aspect of the invention there is provided a computer-readable memory for storing instructions executable in a computer for implementing the method of displaying representations of at least one performance variable of an information handling system on a display of a computing system where the method is performed by a programmed computer system comprising the steps of providing at least one zone in a screen on said display of the computing system, such that each zone represents a threshold value of the performance variables; and providing representations of values of said variables on the screen over time and overlying said zones such that a visual impression is provided by said representations as to the performance of the information handling system.

According to yet a further aspect of the invention there is provided a program storage device readable by a computer, tangibly embodying a program of instructions executable by the computer for implementing on the computer a graphical user interface displaying a representation of the values of at least one variable on a computing system display to provide indications as to how said variables relate to predetermined threshold values of said variables over time, and where said variables relate to an operation of an information handling system, comprising at least one zone in a screen on said display such that each zone represents a threshold value for each of said variables; and a representation of the values of each of said variables over time overlying said zones in accordance with the threshold values of said zones, so as to provide a visual indication of the functioning of the information handling system.

BRIEF DESCRIPTION OF THE DRAWINGS

The foregoing and other objects, aspects and advantages of the invention will be better understood from the following detailed description of a preferred embodiment of the invention with reference to the accompanying drawings in which.

To facilitate reader understanding, common elements in the Figures are referred to with the same reference numbers.

DESCRIPTION OF THE PREFERRED EMBODIMENT OF THE INVENTION

The preferred embodiment to describe and illustrate the subject invention is a performance monitor tool for use in association with computer systems. However, it should be appreciated that the usefulness of the invention is not limited to the monitoring of variables in a computing system environment but can be used in a broad range of information handling technology applications where multi-variable monitoring is appropriate. The applications could include, for example, monitoring operation variables related to power plants, hospitals, aviation industry and military equipment, pulp and paper industry, manufacturing industry and the chemical industry. The term "information handling" is broadly considered to encompass systems and methods designed to compute, classify, process, transmit, receive, store, display, measure, reproduce or utilize any form of information, intelligence or data for business, scientific, control or other purposes.

In general, performance variables can be selected and identified for any activity of a system which varies over time and for which there is a need to follow or monitor the value of that activity. The value of the activity can be detected in any suitable or appropriate manner. The present invention is useful in dealing with performance variables in object oriented computer program technology environment. In object oriented computer programming technology, the design focus of object oriented design is on how a problem to be solved can be broken down into a set of autonomous entities that can work together to provide a solution. The autonomous entities of object oriented technology are called "objects". An object is a data structure and a set of operations or functions, also referred to as methods, that can access that data structure. An interface associated with each object defines the way in which methods operate on their associated object. Objects having similar characteristics and common behavior are grouped together into a class. Each defined object will usually be manifested in a number of instances. Each instance contains the particular data structure for a particular example of the object. The relationship between classes, objects and instances are established during build time or generation of the object oriented computer environment. Examples of common object oriented technology programming languages are C++, SmallTalk® and Java®.

A key relationship between objects in object oriented programming applications is the "notifier/observer" relationship. A "notifier" object may have any number of dependent "observer" objects with which they can be associated. The "observer" object is notified by the "notifier" object when certain events occur on that object. Thus, a subject object acts as a "notifier" object and sends updates of its status to an "observer" object. A "monitor" object class is a subclass of the "observer" object class. The activity or value of an identified performance variable or object can then be readily collected over time. A "monitor" object collects data on a specific performance variable or object.

Figure 1:
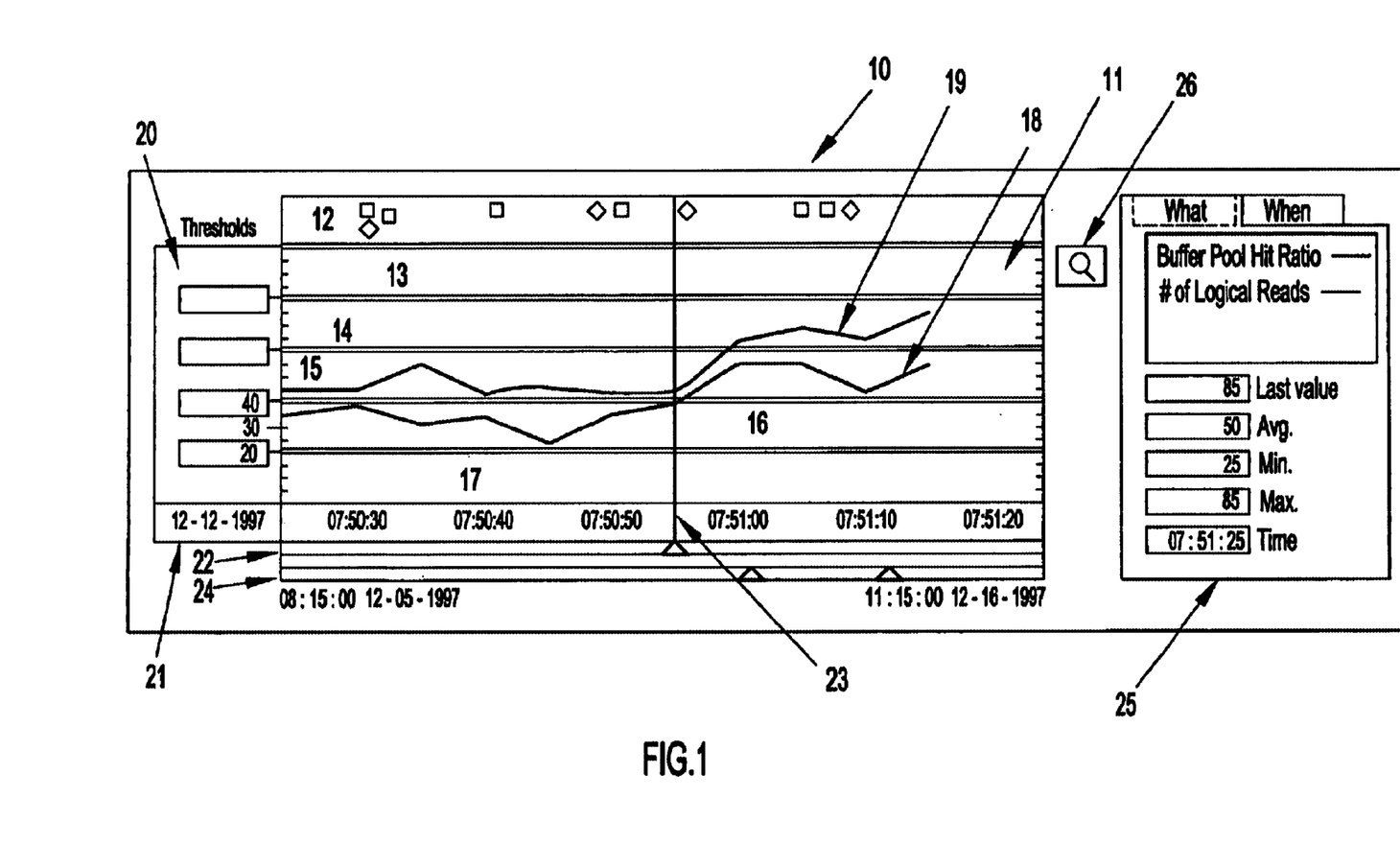
FIG. 1 is a graphical user interface screen illustrating aspects of the subject invention.

With reference to FIG. 1, there is shown an example of the performance monitor graphical interface 10 as contemplated by the present invention. This can be thought of as the activity graph screen over time of the performance monitor. The central part of the display consists of two distinct areas, namely, threshold area 11 and marker area 12. In this preferred embodiment, threshold area 11 is divided into a number of horizontal bands 13 to 17, representing the threshold zones defined for the current monitor application. The horizontal bands or zones represent various threshold values of the variables. At least one threshold zone is required to obtain the beneficial results from use of the invention. Thus, one or more or a plurality of threshold zones are preferred. In a particular embodiment, each band or zone has its own predefined color. The center zone 15 on the screen as shown in FIG. 1 can be thought of as representing normal values for the variables and could be colored green. On each side of the normal zone, there appears zones 14 and 16 which could be thought of as zones representing a warning for the values of the variables involved and could be colored yellow. Above the upper warning zone 14 and below the lower warning zone 16 there appear critical or alarm zones 13 and 17. These could be colored red to represent critical values of the variables. Of course, it is apparent that more or fewer zones than has been illustrated could appear in the performance screen and various colors or ranges of colors could be used to visually convey the severity and criticality of the value of the variables.

The activity graph screen 10 is used to represent a graph over time of data or values collected for one or more performance variables. The horizontal axis represents time and there is no vertical scale shown at this point, only a qualitative indication of the values of the various threshold zones. For the example shown then, threshold area 11 has five zones and could have the following colors starting from the top zone as horizontal bands red 13, yellow 14, green 15, yellow 16 and red 17. If there is no data collected for a performance variable falling within a particular zone that has been previously described, this could be visually indicated by having the zone colored gray or dimmed to visually distinguish it from a zone where the value of a performance variable exists. A zone on the graph remains dimmed until the value of a performance variable has entered into that zone during the monitored period. Only then will the zone be lit up with its color to further assist the operator in quickly ascertaining the severity or criticality of a problem associated with that performance variable. The performance monitor activity display screen is provided in a window by the software operating system of the computer system. Pseudocode to implement the application is subsequently provided in this specification.

In FIG. 1, two distinct line graphs 18 and 19 of values of performance variables are shown plotted as examples in threshold area 11. The line graphs of each performance variable are distinguished from each other by color or in some other visually distinctive manner.

Marker area 12 (previously introduced) contains markers which indicates the occurrence at a particular point in time of a predefined event. Two symbols representing events, a square and a diamond, are shown in marker area 12 for different events. Any suitable distinguishing symbol could be used. The particular events to be followed or identified are pre-chosen by the user and a corresponding marker appears in area 12 when the event occurs. A number in a marker, as shown in FIG. 1, signifies the number of occurrences of that event in the particular time slot. By drilling down on a marker, as is well known, all the collected information pertaining to the corresponding event can be obtained. Examples of events that may be of interest to a user to know when they occurred are the activities of "connect to database" and "deadlocks". Of course, it is apparent that any appropriate event of an information handling system may be identified in the marker area 12. As will be subsequently described, the time axis for both threshold area 11 and marker area 12 is the same and thus correlation between the significance of a marker and a representation of a performance variable or a line graph activity is readily apparent to a user. Thus, the purpose of this specialized marker area 12 is to further enhance the qualitative analysis of the collected or monitored data by noting the occurrence of key events on the same axis as the monitored variables, and having both the events of a variable and the value of a performance variable concurrently displayed. A variable represented by an event in marker area 12 may be one of the same performance variables as appears in threshold area 11. Usually, however, different variables are involved.

The zone border values section 20 of the graphical interface of FIG. 1 is shown with the heading "Thresholds". Section 20 contains a number of fields which represent the boundary values between various zones in threshold area 11. The values inside the fields pertain to the currently selected performance variable which, in this example, is the line graph 18 of a particular performance variable. When a user selects a difference performance variable, the values in the fields in threshold section 20 change to reflect the new defined zone boundary values for that variable. The values displayed in the fields in section 20 pertain to the predetermined threshold values of the particular performance variable between the boundaries of the adjacent threshold zones. If the performance variable does not have a value in a threshold zone, then the adjacent field in a zone boundary value section 20 is blank. For example, with reference to FIG. 1 and the selected performance variable 18, the value 20 in the lower field of section 20 is the boundary value between threshold zone 16 and 17, and the value 40 shown in the next field is the boundary value of the variable between threshold zone 16 and 15. As is apparent from the example in FIG. 1, since each field represents the boundary value between adjacent threshold zones in threshold area 11, there is one less field in section 20 required than the number of zones in area 11. The background of the various fields in section 20 can be made the same color as the corresponding threshold zones in area 11 in order to further provide a visual impact of the potential effect of the values of the displayed performance variable. The third field from the bottom in section 20 represents the upper zone 14. If there were a value (eg. 60) then any data point greater than or equal to 60 would be in the upper yellow zone 14. Leaving this field blank signifies that everything that is not less than or equal to 40 is not in the lower yellow zone 16 and thus it is in the green zone 15 by default.

Each performance variable point which relates to the data collected for that variable, represents a single sample in time and is plotted by the system in its appropriate zone defined by the threshold values relative to the bottom and top of that zone. Some examples will help to illustrate this point. If the value of a variable is 203 and the range of the upper yellow zone is 200 to 210, then die point for this variable will appear ³⁄₁₀ths of the way up into the upper yellow warning zone. Depending upon whether or not the other zones, namely the green, lower yellow and lower red zone, have been squashed or expanded (as will be subsequently described), this point may appear very close to the bottom of the graph or very close to the top of the graph. A different performance variable which works on a percentage scale, for example, could have a point with a value of 23 plotted ³⁄₁₀ths (three-tenths) of the way up the yellow zone as well if its threshold values were set at 10 to 20 for the upper yellow zone. If the performance variable has no threshold set, then all of its values for the data collected will appear in the green zone.

Thus, by continuing the above approach for each of the variables, the different performance variables can have their points plotted on the same activity graph screen and in the same zones regardless of the vertical scale that is used. For example, if percentage central processing unit usage is 63 and its defined upper yellow warning zone is from 60 to 70, then it too will appear ³⁄₁₀ths of the way up the upper yellow warning zone on the graph.

As has been mentioned, the X-axis 21 of the activity graph represents time and is scalable, labeled and scrollable. Thus, the range and magnitude of the scale can readily be changed. Sample time tick marks appear along the bottom edge of the graph in the threshold area and periodic tick marks have actual time associated with them, as shown. In the example illustrated, the time axis is aligned horizontally along the entire width of the graph in the threshold area 11. This time axis also applies to the occurrence of markers in the marker area 12 previously described. A date may also be associated with the time axis.

The time axis area includes a visible period slider bar 22. This consists of a slider bar with a single movable arm at the bottom of the graph. A vertical line 23, as shown in FIG. 1 extending into threshold and marker areas 11 and 12, coincides with the current position of the visible slider arm 22 and movable with it. This has the effect of taking a slice in time of the values of performance variables on the graph in area 11 and any markers in area 12.

A second slider bar 24 parallel to the first and adjacent thereto, contains a shaft with two movable handles with a special zone on the shaft in between the handles. The zone of slider bar 24 between the two handles represents the range of slider bar 22 and the existing displayed range of areas 11 and 12. Slider bar 24 as a whole represents the entire time spectrum of data available for the performance variables and events which are currently not visible on the graph. The range of slider bar 22 is a subset of the range of slider bar 24. The user can then drag either of the two handles on slider bar 24 to enlarge or decrease the region or zones between these two handles. This has the effect of increasing or decreasing the range of slider bar 22, thus scaling the graph by increasing or decreasing the number of visible points on the graph. The user can drag the zone delimited by the two handles on slider bar 24, to effectively scroll the graph. In this case, the two handles do not change position relative to each other and the lower and upper range limits on slider bar 22 increase or decrease together to accommodate the zone drag. This does not change the graph scale of the X-axis. The time and date extent of sampled variables available with adjustment of the handles in second slider bar 24 are shown at either end of slider bar 22.

Detail line area 25 in FIG. 1 represents the data collected the last time a sample was taken for the currently selected performance variable. The name of the selected performance variable is indicated as BufferPool Hit Ratio and corresponds to line graph 18 in threshold area 11. The name of the variable of the second line graph 19 displayed in this example is # of Logical Reads. The names of the performance variables plotted or displayed in threshold area 11 are listed in detailed line area 25 on the screen. Thus, a visible segment of the currently selected performance variable line is provided in a number of fields as shown in area 25, with the display of the variable values of the performance variable including last value, average value, minimum value, maximum value, and the time that the data was collected. The background color of the fields could also be made the same color as the corresponding threshold zones in threshold area 11 and the fields in threshold value section 20 so as to readily provide a visual indication of the significance of the values.

Thus, the detail value section 25 is linked to the plotted performance variables in threshold area 11. The currently selected variable item drives the detailed values and matches the current selection in the graph and any other linked area such as a tabular list. The various line graphs of the performance variables in threshold area 11 include graphs for all of the performance variables that the user has chosen to display. A currently selected performance variable results in the detailed line being drawn with selected emphasis and also drives the values appearing in the detailed line section 25. Also in accordance with standard graphical user interface elements, if the user desires to see the absolute value of a specific point of a graph line, the point can be hovered over with the pointing device and a window containing a graph value overlay is displayed providing the appropriate values.

Zoom button 26, shown in FIG. 1, permits a user to mark out a rectangular area in the threshold area 11 by left-clicking, dragging and releasing the mouse pointer or other pointing device. Once the user releases the mouse button, the area in the threshold area 11 delimited by the drawn rectangle, becomes the chosen area on a separate window display that the user can look at the performance details and related data in more detail.

Figure 2:
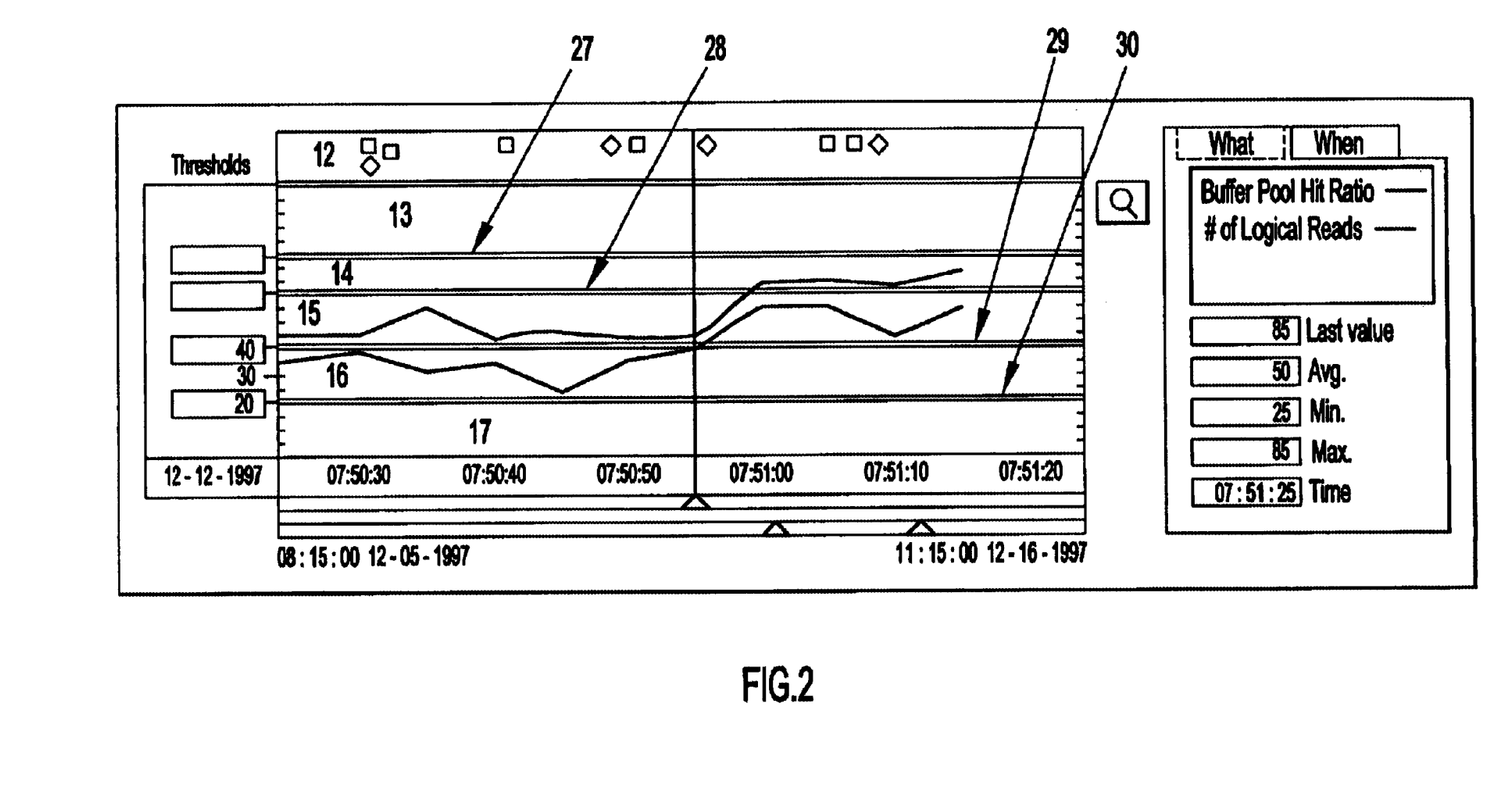
FIGS. 2 and 3 are variations of FIG. 1 showing other features of the graphical user interface illustrated in FIG. 1.
Figure 3:
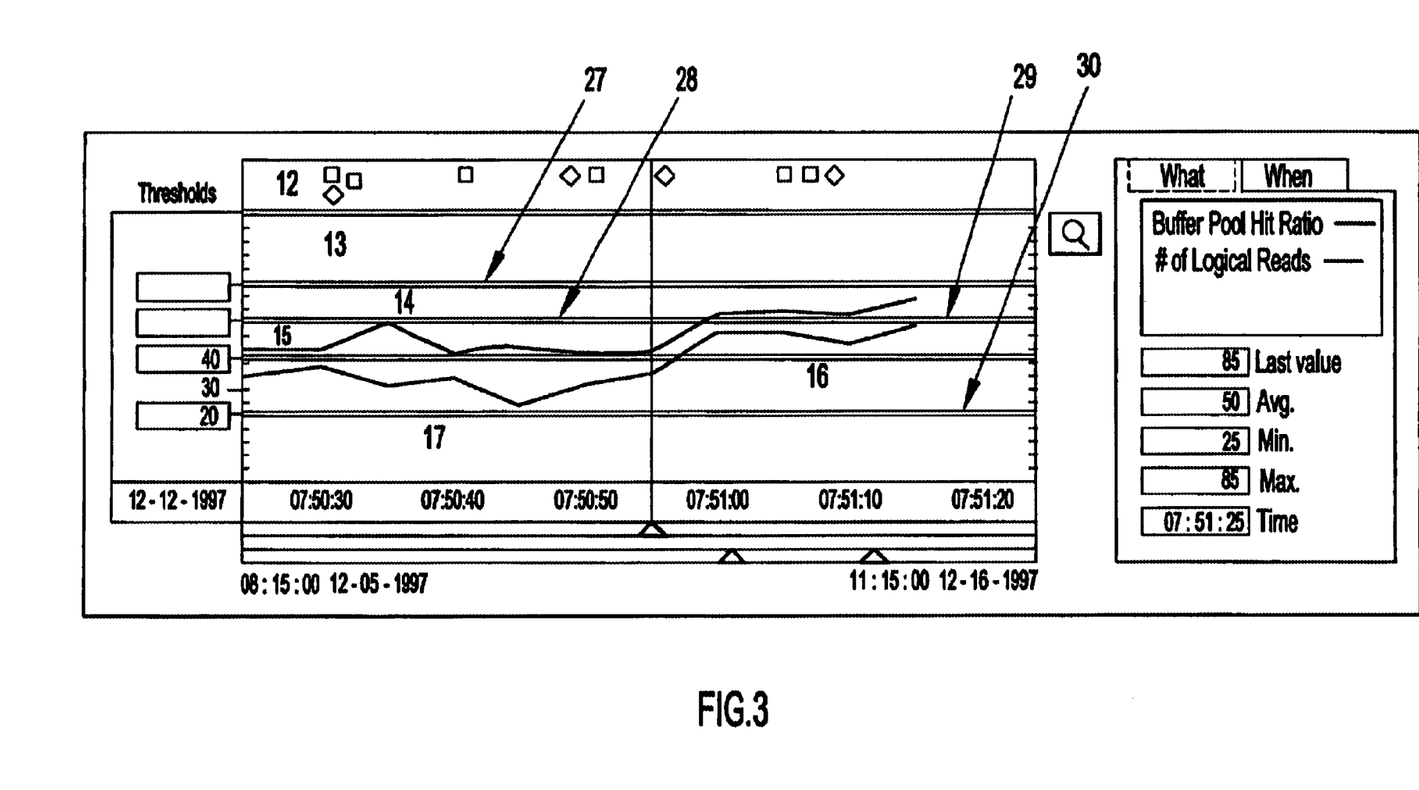

As has been illustrated in FIG. 1, the various threshold zones 13 to 17 are shown as being of equal and consistent size. This is the preferred default configuration for the activity graph section 10. FIGS. 2 and 3, which provide variations of FIG. 1, and which illustrate other features of graphical interface 10 will now be described.

FIGS. 2 and 3 show the adjacent horizontal threshold zones 13 to 17 being separated by split bars 27 to 30 respectively. In other words, each previously described threshold zone is bounded by a split bar which allows a user to increase or decrease the size of the adjacent zone for the purpose of better viewing the activity of the displayed-performance variable.

The previously illustrated zones are shown as horizontal zones and are separated by split bars which allows the user to give more or less screen space to zones of particular interest or less interest, respectively. The split bars can be manipulated by clicking and holding a pointing device on the split bar and then moving the pointing device vertically. By manipulating the split bars, the user can squash or expand any zone to provide a more accurate visual impression. For example, if a user is less interested in anything in normal zone 15, then the user can bring the two split bars 28 and 29 bordering normal zone 15, and the warning zones 14 and 16, respectively, closer together by dragging them individually. With reference to FIG. 2, split bar 27 between upper alarm zone 13 and upper warning zone 14 can be dragged downwardly or pulled down so as to enlarge upper alarm zone 13 as is apparent when the size of this latter zone is compared with the corresponding zone in FIG. 1.

By manipulating the zones themselves, the user can squash or expand adjacent zones. For example, if the user is not interested in anything in normal zone 15 and wishes to expand a critical zone, but not at the expense of a warning zone, the user can drag the entire warning zone to shift it down into the space on the screen which the normal zone o occupies in the default mode of FIG. 1, while at the same time expanding the screen real estate covered by the critical zone. With reference to FIG. 3, starting with the zone variation as shown and described in FIG. 2, the entire lower warning zone 16 has been dragged upwardly while maintaining its size, while the normal zone 15 has been reduced in size and thus the lower alarm zone 17 has been enlarged by a corresponding amount. It is thus apparent with the variations in the threshold zones as described, that the line graphs 18 and 19 and the fields in the zone border values section 20 are also appropriately repositioned.

Where the performance variables relate to events or activities in the operation of a computing system, the activity graph screen and the performance monitor graphical interface as described, rides over and relies on the functioning of the underlying computer operating system and procedures and obtains values for the performance variables therefrom. It is also apparent that in addition to having the values of the performance variables displayed in a graph format in the performance monitor graphical interface of the subject invention, the data collected for the performance variables could also be displayed in a tabular format or any other appropriate representation of the values of the performance variables. The table could show data for each performance variable at a particular slice in time, including performance variable value, average value, minimum value and maximum value. The table could also reflect the colors used in the threshold zones and the zone border value fields as previously described, to indicate a warning or critical value for that performance variable is being approached.

Various performance variables are selected by the user to be displayed on the graph from a tabular list of all variables currently being monitored. The selected variables are simultaneously available and linked to the graph in threshold area 11. The zone border values reflected in the fields in section 20 represent the vertical axis threshold values for the currently selected performance variable graph line. These fields in section 20 represent the maximum number of zones for all performance variable lines that are currently displayed in the zones. When the user selects a new performance variable, the values in these fields change to reflect the threshold values for the new performance variables, Since there can be more than one performance variable line in threshold area 11 at the same time, each with varying number of defined zone boundary values, boundary values which are not defined for the currently selected performance variable will appear blank. When the user selects a different performance variable, some fields may remain blank while others will get filled in with a threshold value in accordance with the values for that particular performance variable. As has been described, for visual clarity and impact, the background color of each field can be made to match the color of the threshold zone to which it applies.

Data for any appropriate performance variable would be meaningful for use with the disclosed invention. Suitable performance variables relating to the functioning of a computer system would include average I/O time, buffer pool hit ratio (%), cache hit ratio (%), CPU usage (%), average response time, current connections, failed SQL statements, pool write time and rows read per second.

A graph value overlay area provides the current absolute value for the points of a particular performance variable graph line appearing in the threshold area 11, as displayed in screen 10. It appears when the user hovers the mouse pointing device over a particular point on a graph line in threshold area 11. As there is no vertical scale shown on the graph, the absolute value of a plotted point is made available by hovering the pointer over a point which causes a temporary popup window to appear with the absolute value of that point. Alternatively, a popup menu could be provided with an absolute value option, as is known in GUI environment. As a further alternative, the slider on 22 could also be used to drive another screen with tabular output to get a quick view of the values of all the performance variables in threshold area 11 at a particular point in time.

The graph area, threshold area 11, marker area 12, and the optional areas zone border section 20 and detailed line section 25 and any tabular list of performance variable data are fully contained within a single standard window of a graphical user interface. This window has an action bar which the user clicks on. A popup menu appears when a user clicks on the right mouse button with the pointing device on a graph line or performance variable in any list or on the graph itself, thus providing more specific details relating to the performance variable. Such options are considered to be standard graphical user interface elements.

From the above, it can be appreciated that the subject invention which is embodied in the activity graph screen of a performance monitor, provides a fisheye graph representing one or more variables. This type of graph is not to scale but reveals more information with respect to the variables and the effect they may have on the functioning of a system and other dependent variables than what would be the case if scaled plots of the variables were to be used. The invention provides the ability to gracefully plot many variables of vastly different scales against time on the same Y-axis and readily provide an indication of the state of each of these variables at a glance. The performance variables are plotted in one or more bands or zones in a threshold area on a display. The operator does not have to calculate values and compare them to other values for each variable monitored on the graph. The user is looking for signs of activities that are critical and may be going wrong in the system, not the absolute values of the variables for which there may be no real appreciated significance. Merely observing a trend of the value of a variable may still not be that meaningful if the trend is within a normal zone and the variable has no critical value. In the context of the subject invention, this situation becomes readily apparent to the user.

The following pseudo-code assumes the reader is familiar with the Java or C++ programming languages. Making use of this code to program a computer system is well within the capabilities of one skilled in the art. This pseudo-code is copyright protected by the Applicant.

The classes detailed below all work together to provide an enhanced slider bar type of GUI control. The fish-eye graph of the present invention is implemented as a slider bar with multiple arms and one or more zones, each zone having its own color.

Since the graph is a Canvas control (like a graphic context), it cannot contain other Component objects (eg. buttons, check boxes, entry fields). In order to add a time axis, border values, a legend, or any other additional GUI elements which interact with the graph, a Panel (which can contain Component objects) must be created with the desired LayoutManager (formatter) and add the graph (SliderAxis) as a Component on the Panel.

The container Panel created, needs to create a SliderAxisSettings object and pass it to the SliderAxis constructor. The container Panel also creates any DrawableSettings subclasses, and adds them as overlays to the graph. These overlays represent the performance variable graph lines, and the markers. The methods for drawing these overlays converts the internal representation of the performance variable and marker (eg. the snapshot times and their values), to create the appropriate Polygon (a predefined graphics class) to draw onto the surface of the graph as an overlay. Since the SliderAxis knows about the existence but not the specifics of the overlays, it calls their draw( ) methods at the appropriate times to overlay the graph lines and markers onto the graph surface.

The SliderAxis class takes care of handling the user interactions: clicking, dragging, etc., and communicates the changes to the appropriate DrawableSettings objects (SliderZoneSettings, SliderArmSettings, SliderShaftSettings, DrawableSettings overlays . . . ).

```
Vector zones = ZondDefinition.getZoneDefinitions( );   // statically defined setup somewhere
Vector activeGraphZoneColours = new Vector(zones.size( ));
Vector inactiveGraphZoneColours = new Vector(zones.size( ));
boolean alwaysActiveFlags[ ] = new boolean[zones.size( )];
int count=0;
for (Enumeration e = zones.elements( );e has MoreElements( );count++)
{
    ZoneDefinition aZone = (ZoneDefinition) e.nextElement( );
    activeGraphZoneColours.addElement(aZone.getActiveColour( ));
    inactiveGraphZoneColours.addElement(aZone.getInactiveColour( ));
    alwaysActiveFlags[count] = aZone.isAlwaysAcitve( );
}
graphSurface = new SliderAxis(graphSurfaceSettings =
                    new SliderAxisSettings(LowerLimit,
                             upperLimit,
                             SliderShaftSettings VERTICALSHAFT,
                             100,                        // shaft width ratio
                             100,                        // shaft height ratio
                             100,                        // arm width ratio
                             2,                          // arm height ratio
                             zones.size( ) – 1,          // number of arms
                             Colour.lightGray,           // arm Colour
                             activeGraphZoneColours,
                             inactiveGraphZoneColours,
                             alwaysActiveFlags,
```

-continued

```
                                              true));                                       // are the zones draggable
//Want all the arms to be of a fixed 5 pixel thickness, so must reset it after creation
for (int i=1; i <= graphSurfaceSettings.getNumberOfArms( ); i++)
    graphSurfaceSettings.getArmSettings(i).setFixedThickness(5);
// Register as an observer of the SliderAxisSettings notifications to drive other parts of the GUI (eg. a table with details)
// with what happens in the graph
graphSurfaceSettings.addObserver(this);
Here is a class hierarchy:
Drawable ------> DrawableSettings ------> SliderZoneSettings
                                          SliderArmSettings
                                          SliderShaftSettings
                                          PVLineSettings       (these are overlays)
                                          MarkerSettings       (there are overlays)
java.awt.Canvas --------------------------> SliderAxis
                                               ↑
java.util.Observer ------------interface---------+ java.awt.Observable ----------------------> SliderAxisSettings
                                               ↑
java.util.Observer ----------------interface---------+
```

Drawable interface draw(Graphics g, Rectangle boundingArea)
        - method which draws the subclasses' visual representation DrawableSettings abstract class     extends the Observable class and implements-the Drawable interface (but leaves the methods abstract)
    defines notifications for RECTANGLECHANGED, SELECTIONSTATECHANGED
    sends a SELECTIONSTATECHANGED notification to any observers if the selection state of the object changes
    has the following attributes with appropriate set( ) and get( ) method:
        whether the DrawableSetting is selected or not
        whether the DrawableSetting is selectable or not
        whether the DrawableSetting is draggable or not
    inside(int x, int y)
        returns false by default
        determines whether the point (x,y) is inside the rectangle which represents the bounds of this object
    getRectangle( )
        abstract method
        returns the rectangle which represents the bounds of this object SliderShaftSettings class     extends DrawableSettings and implements Drawable interface
    represents the details of the shaft component of a SliderAxis
    sends a RECTANGLECHANGED notification to any observers if the rectangle which represents the bounds of this object changes
    has the following attributes with appropriate get( ) and set( ) methods
        shaft fill color
        shaft border (outline) color
        shaft fill color below an arm
        whether or not the shaft is horizontal or vertical
        the rectangle which represents the bounds of this shaft
        the lower limit value the shaft represents
        the upper limit value the shaft represents
        the lower limit which is visible on the shaft
        the upper limit which is visible on the shaft
        whether or not to fill below the arm with the fill color
        whether or not the shaft is scrollable
        the ratio of the shaft width to the canvas it is painted on
        the ratio of the shaft height to the canvas it is painted on
    draw(Graphics g, Rectangle boundingArea)
        draw a rectangle with the fill color
        draw a border around it with the border color
    provide methods to query the position of the shaft
        get the Rectangle
        get the position as a Point
    override the inside( ) method from DrawableSettings
    provide methods to set position and size of the shaft and notify any observers that RECTANGLECHANGED if the refresh parameter is true
        move(int x, int y, boolean refresh)
        reshape(int x, int y, int width, int height, boolean refresh)
        resize(int width, int height, boolean refresh)

SliderArmSettings class extends DrawableSettings and implements Drawable interface
    represents the details of a single arm component of a SliderAxis
    sends a RECTANGLECHANGED notification to any observers if the rectangle which represents the bounds of this object changes
    has the following attributes with appropriate get( ) and set( ) methods
        arm fill color
        the rectangle which represents the bounds of this arm
        the numeric value which this arm represents
        the settings of the shaft onto which this arm is painted
        the point at which this arm makes contact with the shaft it is painted on
        the ratio of the arm width to the canvas it is painted on
        the ratio of the arm height to the canvas it is painted on
        the settings of the immediate neighbouring arm which comes before it on the shaft
        the settings of the immediate neighbouring arm which comes after it on the shaft
        whether or not this arm acts as a wall when another arm hits it
        a Drawable object which represents a special look for the arm (it has a draw( ) method)
        the width of the Drawable object
        whether or not the arm has a fixed thickness (it is not determined by the arm ratio) and its value
    draw(Graphics g, Rectangle boundingArea)
        draw a rectangle with the fill color
        call draw( ) on the Drawable object to put the special arm look (eg. 3D look) on the arm rectangle
    provide methods to query the position of the arm
        getRectangle( ) - return a Rectangle
        getPosition( ) - return the top left Point of the Rectangle
    override the inside( ) method from DrawableSettings
    provide methods to set the position and size of the arm and notify any observers that RECTANGLECHANGED if the refresh parameter is true
        move(int x, int y, boolean refresh)
        translate(int x, int y, boolean refresh)
        reshape(long value, int screenWidth, int screenHeight, boolean refresh)

- recalculates the shape of the arm based on the new value it is being set to
  fakeReshape(long value, int screenWidth, int screenHeight)
  - does a "what if" analysis to calculate what the arm would look like if the value were set differently
  - does NOT send out any notifications
  reshape(int x, int y, int width, int height, boolean refresh)
  resize(int width, int height, boolean refresh)
provide methods to attach/detach this arm from a neighbouring arm appearing before or after it on the shaft
  attachArm(SliderArmSettings arm, int direction)
  detachArm(int direction) - return the SliderArmSettings of the arm it was attached to
  getNumberOfAttached(int direction) - return how many arms are attached in a row
provide methods to handle the special case where this arm is attached to another arm which could also be attached, and so on
  getEffectiveBounds(int direction) - return the Rectangle which represents the area for this arm aid its attached arms in that direction
  moveWithAttached(int x, int y, int direction, boolean refresh)

SliderZoneSettings class extends DrawableSettings and implements Drawable interface
represents the details of a single zone component of a SliderAxis
  - a zone is the area between two arms
defines notifications for STATUSCHANGED
sends a STATUSCHANGED notification to any observers if the status changes from inactive to active or vice versa
sends a RECTANGLECHANGED notification to any observers if the rectangle which represents the bounds of this object changes
has the following attributes with appropriate get( ) and set( ) methods
  active color - color of the zone when it is active
  inactive color - color of the zone when it is not active
  the rectangle which represents the bounds of this zone
  the current status of the zone (active, inactive)
  whether or not the zone is always active or can have its status changed
  a Drawable object which represents a special look for the zone (it has a draw( ) method)
  the width of the Drawable object
draw(Graphics g, Rectangle boundingArea)
  draw a rectangle with the fill color determined by the zone's current status
  call draw( ) on the Drawable object to put the special zone look, if the zone is not always active
    If zone is active, then it appears pushed in
    If zone is inactive, then it appears raised
provide methods to query the position of the zone
  getRectangle( ) - return a Rectangle
  getPosition( ) - return the top left Point of the Rectangle
override the inside( ) method from DrawableSettings
provide methods to set position and size of the zone and notify any observers that RECTANGLECHANGED if the refresh parameter is true
  move(int x, int y, boolean refresh)
  reshape(int x, int y, int width, int height, boolean refresh)
  resize(int width, int height, boolean refresh)
  squashFromAbove(int delta, boolean refresh)
  squashFromBelow(int delta, boolean refresh)
  expandFromAbove(int delta, boolean refresh)
  expandFromBelow(int delta, boolean refresh)
  squashFromRight(int delta, boolean refresh)
  squashFromLeft(int delta, boolean refresh)
  expandFromRight(int delta, boolean refresh)
  expandFromLeft(int delta, boolean refresh)
  moveByPoint(Point delta, boolean refresh)

SliderAxisSettings extends Observable and implements the Observer interface
defines notifications for
  ARMVALUECHANGED
  ARMDRAGCOMPLETE
  ZONEACTIVATED
  ZONEDEACITVATED
  ZONEAREACHANGED
  OVERLAYAREACHANGED
  SELECTEDOVERLAYCHANGED
receives notifications from SliderArmSettings, SliderZoneSettings, and generic DrawableSettings (such as overlays)
sends notifications in response to received notifications to make them more informative for its own observers
handles all the interaction between its components; the constructor does the following:
  Create a SliderShaftSettings for the shaft and handles any notification from it
  Registers as an observer of the shaft settings
  Creates a SliderArmSettings for each slider arm req'd (passing it a reference to the SliderShaftSettings) and handles any notifications from them
  Creates a SliderZoneSettings for each area delimited by the slider arms required and handles any notifications from them
  Forces the first and last zone non-draggable, since there is no arm attached at the ends
has the following private attributes with no direct get( ) and set( ) methods
  a Vector SliderArmSettings
  a Vector SliderZoneSettings
  a Vector DrawableSettings for the overlays
  which arm number was last observed
has the following shaft related methods
  getShaftSettings( ) - returns the SliderShaftSettings
  getLowerLimit( ) - returns the lowest value the shaft represents -continued

```
            setLowerLimit(long lowerLimit)
            long getUpperLimit( ) returns the lowest value the shaft represents
            setUpperLimit(long upperLimit)
    has the following arm related methods
            getArmSettings(int index) - returns the SliderArmSettings for the specified arm number
            getNumberOfArms( ) - returns the number of arms on the shaft
            insideArm(int x, int y) - returns the arm number which the point (x,y) is contained in
            getValue( ) - returns the value of the current arm (internal pointer to a current arm)
            getValue(int thisArm) - returns the value of the specified arm
            notifyFinalPosition(int thisArm) - sends out an ARMDRAGCOMPLETE message for the specified arm
                    - use this method if you need to notify any observers of the end of a drag operation
                    - by default observers are notified of all arm moves as they happen
    has the following zone related methods
            getZoneSettings(int index) - returns the SliderZoneSettings for the specified zone number
            getNumberOfZones( ) - returns the number of zones on the shaft
            insideZone(int x, int y) - returns the zone number which the point (x,y) is contained in
    has the following zone related methods
            addOverlay(DrawableSettings overlay)
                    add the DrawableSettings object as an overlay
                    handle any notifications from this object
            removeOverlay(DrawableSettings overlay)
                    remove the DrawableSettings object as an overlay
                    no longer handle any notifications from this object
            getOverlaySettings(int index) - returns the DrawableSettings for the specified overlay
            getNumberOfOverlays( ) - returns the number of overlays on the shaft
            insideOverlay(int x, int y) - returns the overlay number which the point (x,y) is contained in
Implements the observer interface to convert notifications coming in into something more usable by this object's observers . . .
    if the sender is a SliderArmSettings that this is currently observing
        if the notification message is RECTANGLECHANGED
            send out an ARMVALUECHANGED notification with the arm number
    else if the sender is a SliderZoneSettings that this is currently observing
        if the notification message is STATUSCHANGED
            send out a ZONEACTIVATED or ZONEDEACTIVATED notification with the zone number (depending on the status of the zone)
        else if the notification message is RECTANGLECHANGED
            send out a ZONEAREACHANGED notification with the zone number
    else if the sender is a DrawableSettings that this is currently observing (i.e an overlay on the graph)
        if the notification message is RECTANGLECHANGED
            send out an OVERLAYAREACHANGED notification with a reference to the sender
        else if the notification message is SELECTIONSTATECHANGE
            send out a SELECTEDOVERLAYCHANGED notification with a reference to the sender
SliderAxis a Canvas to draw the graph on
takes a single parameter - SliderAxisSettings in its constructor and registers itself as an observer of it
receives notifications from the objects it controls
has the following private attributes with no direct get( ) and set( ) methods
    the mouse position of the last mouse down event
    the mouse position of the last mouse event (down, drag, up, . . . )
        set this to NULL when you are in the process of handling a potential drag event
    the drag point offset
        an offset used in calculating where the arm should move to relative to the current mouse position
    whether or not mouse drag events should currently be ignored
        this is true when the mouse drifts outside the region you are dragging
    which arm is currently being dragged (0 if none)
    which zone is currently being dragged (0 if none)
    the offset between the arm and the zone positions
        used to reposition arms as a result of zone drags and when moving colliding arms together as a unit
the currently selected overlay object
Provide methods for changing the state of the SliderAxisSettings
    setZoneState(int zoneNumber, boolean active)
        get the SliderZoneSettings for the specified zone
        activate/deactivate the specified zone
        repaint the specified zone
    setValue(int whichArm, long value) - used externally to reposition an arm to a different value
        get the SliderArmSettings for the specified arm
        fake a mouse click inside the arm rectangle
        fake a drag of the arm to the rectangle which represents the value specified
    getSelectedOverlay( )
        Return the DrawableSettings of the currently selected overlay
    draw(Graphics g, Rectangle boundingArea)
        call draw( ) on the SliderShaftSettings to draw the shaft
        call draw( ) on each SliderArmSettings object (i.e. each arm) on the shaft
        call draw( ) on each SliderZoneSettings object (i.e. each zone) between the arms on the shaft
        call draw( ) on the Drawable objects that have been added as overlays to the SliderAxis
    update(Graphics g)
        override the Canvas' update method to call this paint method instead
    paint(Graphics g)
        create a double buffer by creating an offscreen image to draw on
        call draw passing it the offscreen image
```

-continued

```
            draw the off screen image
    Handling mouse down events
        Determine where the mouse click is by calling the inside( ) methods of all Drawable objects
        (i e. SliderShaftSettings, SliderZoneSettings, SliderArmSettings, overlays)
        If inside an overlay and the overlay is selectable
            toggle the state of the overlay (selected/unselected)
            deselect the currently selected overlay
            set the current selected overlay to be the one that was just clicked on
        Else if inside an arm
            Keep the mouse location around and use as an offset
            Determine which arm you are moving
            Save the arm number for the duration of the drag events
        Else if inside a zone
            Keep the mouse location around and use as an offset
            Determine which zone you are moving
            Save the zone number for the duration of the drag events
Handling mouse drag events
    If had clicked inside an arm to start the drag
        If drifted outside the arm
            Ignore the drag
        Else if the mouse position is still inside the arm
            If went off the deep-end previously
                Wait until the mouse is back on the arm and treat it as a new mouse down event
                set a flag to signal that you no longer are ignoring mouse moves
            If no longer ignoring mouse moves (back on track)
                adjust the arm
    Else if had clicked inside a zone to start the drag
        If drifted outside the zone
            Ignore the drag
        Else if the mouse position is still inside the arm
            If went off the deep-end previously
                Wait until the mouse is back on the zone and treat it as a new mouse down event
                set a flag to signal that you no longer are ignoring mouse moves
            If no longer ignoring mouse moves (back on track)
                adjust the zone and the arms adjoining it
Handling mouse up events
    If had clicked inside a zone to start the drag
        If have single clicked and this is NOT part of a drag
            toggle the state of the selected zone
            repaint the zone
    Else if had clicked inside an arm to start the drag and NOT drifted outside the arm
        adjust the arm
        If the mouse up event is NOT a fake one
            tell the SliderArmSettings to notify any observers that this is the end of an arm drag
    Else if had clicked inside a zone to start the drag and NOT drifted outside the zone
        adjust the zone and the arms adjoining it
methods for calculating the new positions of the arms and zones as a result of a mouse drag
    adjustTheArm(int x, Int y)
        If the current aim is a wall (i.e not draggable)
            ignore subsequent drags
        If not ignoring drags
            If this arm movement is a result of a zone drag
                need to drag along a trailing arm
                determine the suggested arm position, and the change from the last drag
                remember to add the zone offset in case a zone drag is actually controlling the arm drag
                set the new position of the current arm default it to the suggested one
                determine the direction the arm is moving
                If moving lower along the shaft (down for vertical shaft, left for horizontal shaft)
                    Detach the arm in the other direction
                    If this arm drag is initiated from a zone drag
                        Need to detach the trailing zone's attached arms as well
                        Remember to ignore drags for arms that are walls (non-draggable)
                If still in a NOT ignore drag state
                    customize the following Steps depending on 2 factors: the direction of motion; and the orientation of the shaft
                    find the number of attached arms
                    find the effective rectangle of this arm group
                    For each arm in the direction of motion, check for collisions
                        If the arm movement is a result of a zone drag
                            drag the trailing arm along
                        If the newly colliding arm is a wall
                            ignore subsequent drags
                        Move the colliding arm the delta that applies to it
                        paint( )
                        Adjust the delta of motion for the next iteration
                    If there is still some delta of motion to move the arm by
                        Check that the arm group will not blow the end of the shaft
                        paint( )
```

© Copyright IBM Canada Ltd., International Business Machines Corporation

While the invention has been particularly shown and described with reference to a preferred embodiment, it will be understood by those skilled in the art that various changes in form and detail may be made to what has been described and illustrated without departing from the spirit and scope of the invention. The details described and illustrated in the disclosed performance variable interface, including the number, nature and position of the threshold zones, the colors suggested, the arrangement and selection of the performance variables, are for illustration purposes only. Alternatives and other options would be readily apparent to those skilled in the art. The scope of the invention is set forth in the appended claims.

The embodiments of the invention in which an exclusive property or privilege is claimed are defined as follows:

1. A graphical user interface displaying a representation of the values of at least one detected performance variable, which has been automatically detected by automatically monitoring system performance, on a computing system display to provide indications as to how said detected variables relate to predetermined threshold values of said variables over time, and where said variables relate to an operation of an information handling system, comprising:
    at least one zone in a screen on said display such that each zone represents a threshold value for each of said variables, and;
    a representation of the detected values of each of said monitored variables over time overlying said at least one zone in accordance with the threshold values of said zones, so as to provide a visual indication of the functioning of the information handling system;
    wherein said interface automatically varies display of at least one of said at least one zone and said representation of detected values over time in response to user input.

2. The graphical user interface of claim 1 further comprising a marker zone indicating one or more events associated with said variables said information handling system occurring at a point in time.

3. The graphical user interface of claim 2, wherein said zones are arranged in horizontal bands on said screen.

4. The graphical user interface of claim 2, wherein each zone covers an equal amount of real estate of said screen.

5. The graphical user interface of claim 3 wherein the horizontal bands cover unequal portions of the real estate of the screen.

6. The graphical user interface of claim 1 wherein said at least one zone consists of a plurality of zones and includes:
    a zone which represents normal values for each variable;
    at least one zone which represents warning values for each variable; and
    at least one zone which represents-critical values for each variable.

7. The graphical user interface of claim 6 wherein:
    the at least one zone which represents warning values of said variable comprises two warning zones which are located on either side of said zone which represents normal values; and
    the at least one zone which represents critical values of said variable comprises two critical zones which appear above and below the zones of warning values.

8. The graphical user interface of claim 6, wherein each zone covers an equal amount of real estate of said screen.

9. The graphical user interface of claim 7 wherein said zones are visually distinguished from each other.

10. The graphical user interface of claim 9 wherein the various zones have backgrounds of different colors and the background colors are selected from the group of colors consisting of green, yellow and red.

11. The graphical user interface of claim 7, wherein said zones are arranged in horizontal bands on said screen.

12. The graphical user interface of claim 11 wherein the horizontal bands cover unequal portions of the real estate of the screen.

13. The graphical user interface of claim 7, wherein each zone covers an equal amount of real estate of said screen.

14. The graphical user interface of claim 6 wherein said zones are visually distinguished from each other.

15. The graphical user interface of claim 14 wherein the various zones have backgrounds of different colors and the background colors are selected from the group of colors consisting of green, yellow and red.

16. The graphical user interface of claim 6, where said zones arranged in horizontal bands on said screen.

17. The graphical user interface of claim 16 wherein the horizontal bands cover unequal portions of the real estate of the screen.

18. The graphical user interface of claim 1 further comprising a zone border value section displayed on said screen providing the threshold values for each of said zones.

19. The graphical user interface of claim 18 wherein said zone border value section provides threshold values for each of said zones for a selected performance variable.

20. The graphical user interface of claim 1, further comprising display of a detailed line section displaying details of a selected performance variable at a particular point in time including the name of the performance variable and a variety of values selected from the group of: the last value, the average value, the maximum value, the minimum value, of the variable.

21. The graphical user interface of claim 1 wherein said representations of the value of the variables are plotted as line graphs in said at least one zone.

22. The graphical user interface of claim 21 wherein a plurality of line graphs of the values of performance variables are plotted in said at least one zones.

23. A program storage device readable by a computer, tangibly embodying a program of instructions executable by the computer for implementing on the computer the graphical user interface as defined in claim 1.

24. A method of displaying representations of at least one performance variable of an information handling system on a display of a computing system where the method is performed by a programmed computer system comprising the following steps:
    automatically monitoring system performance and automatically detecting at least one system performance variable;
    providing at least one zone in a screen on said display of the computing system, such that each zone represents a threshold value of the performance variables;
    providing representations of values of said detected variables on the screen over time and overlying said zone such that a visual impression is provided by said representations as to the performance of the information handling system; and
    automatically varying display of at least one of said at least one zone and said representation of detected values over time in response to user input.

25. The method of claim 24 further including the step of providing a marker zone on the screen for indicating the occurrence over time of one or more events associated with said performance variables of the information handling system.

26. The method of claim 25 wherein said step of providing at least one zone consists of providing a plurality of zones and includes:
provid a zone which represents a normal value for each variable;
providing at least one zone which represents a warning value for each variable; and
providing at least one zone which represents a critical value for each variable.

27. The method of claim 26 such that the step of providing a plurality of zones includes:
providing zones which represent warning values of said variable appearing on either side of said normal zone; and
providing zones which represent critical values of said variables appearing above and below the zones of warning values for said variable.

28. The method of claim 25 wherein said zones are arranged in horizontal bands on the screen.

29. The method of claim 28 wherein each of said zones covers equal portions of real estate of said screen.

30. The method of claim 28 wherein each of the horizontal bands covers an unequal portion of the real estate of the screen.

31. The method of claim 24 wherein said step of providing at least one zone consists of providing a plurality of zones and includes:
providing a zone which represents a normal value for each variable;
providing at least one zone which represents a warning value for each variable; and
providing at least one zone which represents a critical value for each variable.

32. The method of claim 31 such that the step of providing a plurality of zones includes:
providing zones which represent warning values of said variable appearing on either side of said normal zone; and
providing zones which represent critical values of said variables appearing above and below the zones of warning values for said variable.

33. The method of claim 32, further comprising visually distinguishing each one of said plurality of zones from each other one of said plurality of zones.

34. The method of claim 33 wherein said visually distinguishing said zones comprises providing backgrounds of different colors such that the background colors are selected from the group of colors consisting of green, yellow and red.

35. The method of claim 32 wherein said zones are arranged in horizontal bands on the screen.

36. The method of claim 35 wherein each of said zones covers equal portions of real estate of said screen.

37. The method of claim 35 wherein each of the horizontal bands covers an unequal portion of the real estate of the screen.

38. The method of claim 31 wherein said zones are arranged in horizontal bands on the screen.

39. The method of claim 38 wherein each of said zones covers equal portions of real estate of said screen.

40. The method of claim 38 wherein each of the horizontal bands covers an unequal portion of the real estate of the screen.

41. The method of claim 24, further comprising visually distinguishing each one of said plurality of zones from each other one of said plurality of zones.

42. The method of claim 41 wherein said visually distinguishing said zones comprises providing backgrounds of different colors such that the background colors are selected from the group of colors consisting of green, yellow and red.

43. The method of claim 24, further comprising providing a zone border value section on said screen which provides threshold values for each of said at least one zone.

44. The method of claim 43 including the step of selecting a particular performance variable and displaying in said zone border value section, threshold values for each of the zones for said selected performance variable.

45. The method claim 24 further including the step of providing a detail line section on the screen which displays details of a selected performance variable at a particular point in time, including the name of the performance variable and a variety of values selected from the group of: the last value, average value, minimum value, maximum value of the performance variable.

46. The method of claim 24 wherein said step of providing representations of values of said variables includes the step of plotting as a line graph in said plurality of zones, the values of said variable over time.

47. The method of claim 24 wherein said step of providing representations of values of said variables includes the steps of plotting a plurality of line graphs of performance variables in said zones over time, corresponding to each variable.

48. A computer-readable memory for storing instructions executable in a computer for implementing the method of displaying representations of at least one performance variable of an information handling system as is defined in claim 24.

49. A program storage device readable by a machine, tangibly embodying a program of instructions executable by the machine to perform method steps for displaying representations of at least one performance variable of an information handling system, said method steps comprising the method of claim 24.

* * * * *